United States Patent [19]

Ptasienski et al.

[11] Patent Number: 4,496,515

[45] Date of Patent: Jan. 29, 1985

[54] METHOD FOR CUTTING GYPSUM BOARD WITH HIGH VELOCITY FLUID CUTTING JET

[75] Inventors: Mitchell P. Ptasienski, Lake Zurich; Robert M. Mustoe, Winnetka, both of Ill.; Fred H. Zajonc, deceased, late of Richmond, Va., by Margaret S. Zajonc, executrix

[73] Assignee: United States Gypsum Company, Chicago, Ill.

[21] Appl. No.: 191,888

[22] Filed: Sep. 29, 1980

[51] Int. Cl.³ .............................................. B32B 31/18

[52] U.S. Cl. ..................................... 264/504; 264/145

[58] Field of Search .................... 264/504, 145; 83/53, 83/177

[56] References Cited

U.S. PATENT DOCUMENTS

| | | | |
|---|---|---|---|
| 3,524,367 | 8/1970 | Franz | 83/53 |
| 3,532,014 | 10/1970 | Franz | 83/53 |
| 3,557,651 | 1/1971 | Byrley | 83/303 |
| 3,985,848 | 10/1976 | Frische et al. | 264/504 |
| 3,997,111 | 12/1976 | Letz | 239/1 |
| 4,137,804 | 2/1979 | Gerber | 83/177 |
| 4,140,038 | 2/1979 | Higgins | 83/177 |
| 4,183,987 | 1/1980 | Eby et al. | 83/53 |

OTHER PUBLICATIONS

Flow Industries Equipment Bulletin No. 5/78.
*Compressed Air Magazine,* Feb. 1977, pp. 11-14.
*Machine Design,* 2-22-73, pp. 90-93.

*Primary Examiner*—John A. Parrish
*Attorney, Agent, or Firm*—Samuel Kurlandsky; Robert M. Didrick; Robert H. Robinson

[57] ABSTRACT

Gypsum board is formed into a continuous sheet by depositing an aqueous slurry of calcium sulfate hemihydrate, including conventional additives, between two paper cover sheets on a moving conveyor. After the slurry has reached the initial stiffening degree of set and before the slurry has reached a final or temperature rise set, and in the preferred form before it has reached a Vicat set, the moving sheet is transversely cut into individual boards by means of a high pressure and velocity fluid cutting jet. Since the cutting may be carried out before the Vicat set is reached, the board line may be operated at an increased velocity, thereby enabling a particular board line materially to increase its production within a given period of time and to use conveying equipment which is shorter in length.

11 Claims, 2 Drawing Figures

METHOD FOR CUTTING GYPSUM BOARD WITH HIGH VELOCITY FLUID CUTTING JET

BACKGROUND OF THE INVENTION (1) Field of the Invention

The present invention relates to the production of gypsum wallboard, and more particularly is concerned with a method for cutting gypsum wallboard by means of a high velocity fluid cutting jet to increase the rate of production.

(2) Prior Art

The conventional process for making gypsum wallboard comprises forming an aqueous slurry of calcium sulfate hemihydrate, and depositing the slurry between two sheets of gypsum board cover sheet paper on a continuous conveyor belt having a reach length of from about 200 to about 1000 ft. The belt may be operated at a speed of 50–200 ft. per minute and typically about 110 ft. per minute. As the deposited slurry and paper travel, the calcium sulfate hemihydrate continually combines with the water in the slurry. The slurry first goes through a phase termed the initial stiffening or initial set, and subsequently reaches a Vicat set. After the Vicat set the board is conventionally cut by means of rotary knives. If the board is cut substantially before the gypsum has reached the Vicat set, the knives will not properly cut the board. Because of the softness of the gypsum material, there is a tendency for the knives either to mash the ends of the boards or for the boards to hang up because of an impression made in the board (the paper not being cleanly cut on both the top and bottom of the board). The necessity for postponing the cutting of the board until the gypsum at the cutting area has reached a Vicat set and almost a temperature rise set places a limit in the speed at which the belt may be moved and thus the rate at which the production of gypsum board takes place.

SUMMARY OF THE INVENTION

It is therefore an object of the invention to provide a method for cutting gypsum board which is rapid and which provides clean edges at the ends of the cut gypsum boards.

It is an additional object to provide an apparatus for cutting gypsum board which permits a more rapid rate to be used for operating the continuous conveyor on which the gypsum board is formed, without requiring the length of the conveyor to be increased.

It is a further object to provide an apparatus and method for forming gypsum board which permits the continuous sheet to be cut before the gypsum slurry reaches the Vicat set stage.

It is still another object to provide a method for cutting gypsum board which utilizes apparatus which is relatively inexpensive to fabricate and to operate.

Still other objects and advantages of the invention will readily present themselves to one skilled in the art upon reference to the following specification, the drawing, and the claims.

According to the invention, gypsum wallboard is prepared by depositing an aqueous slurry of calcium sulfate hemihydrate between paper cover sheets on a moving endless flexible belt. After the gypsum has reached the initial stiffening but before it reaches the temperature rise set or final set and preferrably before it has reached the Vicat set stage, the gypsum sheet is cut transversely by means of a high pressure and velocity fluid cutting jet mounted on a suitable carriage adapted to follow the motion of the moving gypsum sheet during the transverse cutting process. After cutting, the individual gypsum boards are permitted to reach a final set, and subsequently completely dried in a kiln.

DESCRIPTION OF THE PREFERRED EMBODIMENT

Figure 1:
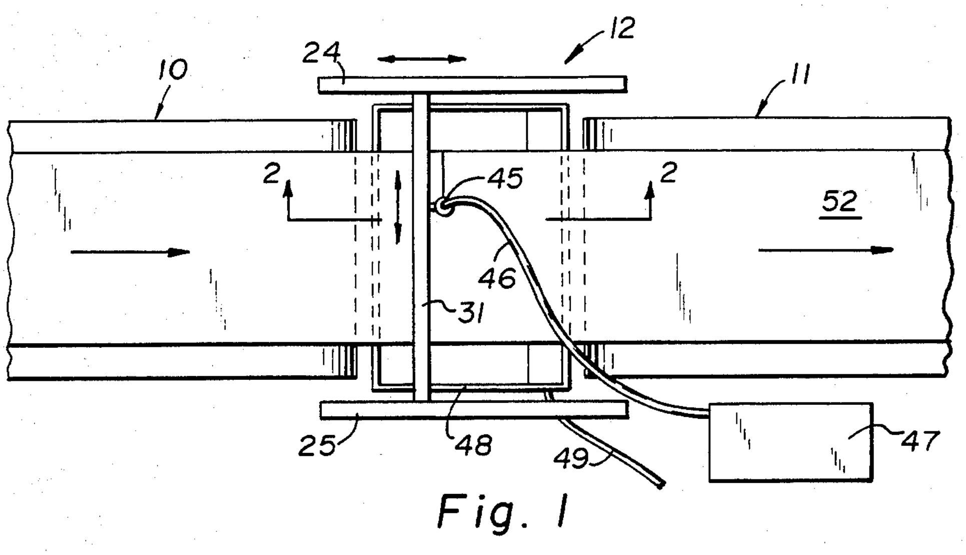
FIG. 1 is a top view of a gypsum board cutting apparatus according to the invention.
Figure 2:
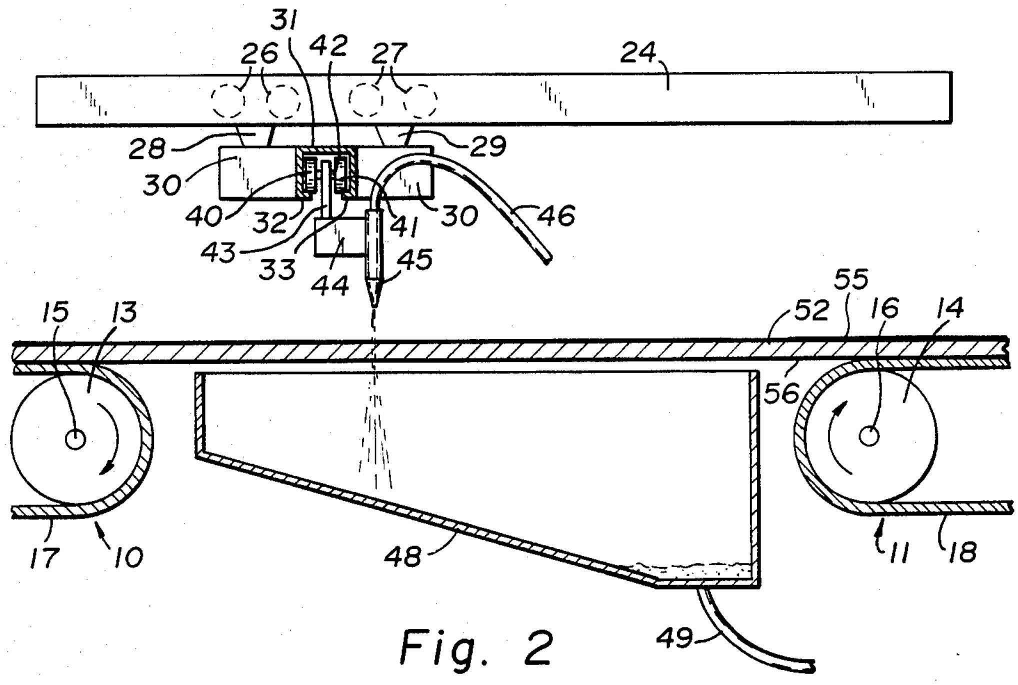
FIG. 2 is a cross-sectional view taken at the line 2—2 of FIG. 1, looking in the direction of the arrows.

Referring to FIGS. 1 and 2 of the drawing, an apparatus which may be utilized to carry out the process of invention is shown, comprising a gypsum board-transporting apparatus 10 and 11 having a reciprocating carriage assembly 12 for supporting the cutting assembly. The transporting apparatus (shown in FIG. 2) comprises rolls 13 and 14 mounted on shafts 15 and 16, having endless belts 17 and 18 mounted over the rolls 13 and 14, respectively, and supplemental rolls, not shown. The carriage assembly is supported on longitudinal tracks 24 and 25 which are supported above the transporting apparatus 12 by conventional means not shown. As shown in FIG. 2, rollers 26 and 27 are mounted on the tracks 24 and 25 and have dependent suspension rods 28 and 29 which support carriage members 30 on each side of the appartus. Affixed to the carriage members 30 is a transverse channel track 31 having roller support flanges 32 and 33. Rollers 40 and 41 are mounted in the channel track 31 and are joined by a pin 42.

A vertical support bar 43 has the pin 42 disposed through an opening therein. The support bar in turn has a jet nozzle support 44 affixed thereto, with a high pressure jet nozzle 45 affixed to the support 44. A fluid supply conduit 46 supplies fluid such as water under high pressure to the nozzle 45, the pressure being provided by a high pressure pump 47. The expended fluid is collected in a fluid vat or tank 48 and drained by a fluid conduit 49. A sheet of gypsum board 52 is shown being transported over the belts 17 and 18.

In operation a slurry of calcined gypsum is deposited on the belt 17 between a pair of paper cover sheets 55 and 56. The gypsum sheet thus deposited is carried by the belt 17 toward the jet cutting nozzle 45 mounted on the carriage 12. As the calcined gypsum slurry progresses, the water in the slurry gradually combines with the calcined gypsum and causes the gypsum partially to set. Timing of the transporting mechanism is so arranged that at the time the gypsum board arrives at the cutting apparatus it has reached the initial stiffening set, but has not yet reached the Vicat set. As the board reaches the cutting apparatus, the carriage moves along with the board at the same velocity. At the same time the jet cutter nozzle 45 moves along the transfer track 31 while high pressure fluid is applied to the nozzle. The high pressure fluid cuts through the gypsum as the jet progresses laterally and at the same time longitudinally with the board, and accomplishes a clean cut across the entire gypsum board. The carriage then retracts to the starting position and begins another cut. The cutter can alternatively make each cut in the same direction or in an opposite direction. Because the carriage moves at the same speed as the gypsum board, a perpendicular cut is accomplished. Further a very clean cut results even though the gypsum slurry has not yet completely set.

In the conventional manufacture of gypsum board, the board is normally cut by matching knife blades which rotate about an axis oriented in the direction of travel of the board panel. In order to obtain gypsum board having smooth cut edges, it is necessary to cut the board close to or after the point at which the gypsum has reached the Vicat set. If the cutting is attempted before the gypsum has reached the Vicat set, the knives will not cut the board cleanly, but will tend to mash the ends or have the board hang up during subsequent drying in the kiln because of a slight impression being made in the paper cover sheets which are on the top and bottom of the board.

In the conventional method of making gypsum board referred to, an aqueous slurry of calcined gypsum containing other additives is poured between two pieces of paper cover sheets having folded edges and placed on a continuous rubber conveyor belt. The belt can be within a range of from 200 to 1000 feet in length, depending upon the speed for which the line has been designed. As the poured slurry progresses, it is at first shiny and glossy and is comprised of a combination of water and calcium sulfate hemihydrate or calcined gypsum. As the calcined gypsum gradually combines with the water in the slurry as the board travels, the gypsum first looses its gloss and then enters the stage called "initial stiffening". The gypsum then proceeds to attain a phase which is measureable and which is called the Vicat set. Ultimately the gypsum reaches the final set or temperature rise set stage. When utilizing conventional cutting methods it has been necessary to allow the gypsum board material to reach Vicat set, or very close thereto, prior to cutting the board with matching knives. The reason for this is that if the board has not set to substantially the Vicat set, the knives will not cut the board. Even when the board is cut by conventional rotary cutters after the Vicat set is reached, the resulting cut edges are serated and must subsequently be trimmed with a saw blade.

In forming gypsum wallboard, there are three important points in the stages during which the newly mixed calcium sulfate hemihydrate aqueous slurry goes through the various stages of setting. The degree of set is best determined by mechanical tests. For this purpose the 300 gram Vicat Apparatus (described in ASTM C-472) is a useful tool.

The various phases of set may be defined as follows: Initial stiffening, Vicat set, and temperature rise or final set.

At initial stiffening the slurry for forming the board has set to the degree that when a "Vicat" needle is drawn through the slurry there is no flow back. In determining the initial stiffening point, the needle is passed through the slurry at 15 seconds intervals until the slurry fails to flow or fall in behind the needle as it is pulled through the mass. At that point the slurry has reached the initial stiffening stage. In gypsum board manufacture it has been found that initial stiffening generally occurs between 1.0 and 2.5 minutes after the slurry has formed. However, the initial stiffening may occur before 1 minute or after 2.5 minutes, depending on whether accelerators or retarders have been utilized in the slurry. It has been found that by use of the high pressure jet cutter, gypsum board may be satisfactorily cut at or after the initial stiffening stage and substantially before the Vicat set.

The Vicat set is described in ASTM C-472 bulletin. The Vicat set, using the 300 gram needle for measurement, is achieved when the Vicat needle no longer penetrates to the bottom of the slurry mass when the needle is applied to the slurry. At this point the gypsum board is quite rigid and not readily deformed. When utilizing conventional rotary knives, the board should have reached at least the Vicat set in order for a satisfactory cut to be made. When the board is cut with conventional rotary knives substantially prior to Vicat set, the board exhibits end damage (bond loss and distortion).

The temperature rise set is the point in the set at which the slurry has reached the maximum temperature resulting from the reaction of the combining stucco or calcium sulfate hemihydrate with water. In conventional gypsum board operations, the rotary knife is normally arranged to cut the gypsum board at a time after the slurry has reached the Vicat set and before it has reached the temperature rise set.

The following examples are provided to demonstrate the operation of the present invention, but are not intended to be limiting in any manner.

EXAMPLE 1

In order to determine whether the fluid jet cutter could be used to cut gypsum board at a point earlier than can be done with conventional rotary knives, a production line was set up with a line speed of 101 feet per minute. The jet cutter was positioned approximately 40 feet closer to the mixture than the rotary knife so that the cut was made at 3.39 minutes from the mixture with no change in the line speed. Initally, the rotary knife as well as the jet cutter performed satisfactorily. At 10:10 a.m. the operation was switched from the rotary knife to the jet cutter and continued using the jet cutter until 11:55 a.m. Shortly after 10:30 a.m. the potassium sulfate accelerator was removed from the mix, and the calcium sulfate dihydratesugar accelerator, a conventionally used accelerator, was reduced in amount in steps in preparing the mix. When 50% of the latter accelerator had been removed, the board slurry when it arrived at the jet cutter was past the initial stiffening stage but too soft to make a satisfactory cut with the rotary knife. Cuts were then made with the jet cutter with excellent results, and the cut board appeared to be as good as had been previously made before the accelerator was removed. The result of the experiment clearly demonstrated that the jet cutter can be utilized to cut gypsum board at a point earlier in the set than is possible with the rotary knife.

EXAMPLE 2

Test gypsum board was made by taking the calcium sulfate hemihydrate slurry from the mixing area, placing it between sheets of board paper, and then placing it in a steel frame having top and bottom plates and a central slot about $\frac{3}{4}''$ wide in the plate to permit cutting. The plates were spaced to provide a board sample $\frac{1}{2}''$ in thickness. The experimental board contained in the steel frame was placed on a conveyor operated at a speed of about 240 feet per minute. At a point 2.48 minutes after being removed from the mixing area the sample was cut in the slotted area using the fluid jet cutter. At this point, the slurry had reached the initial stiffening stage of the set but was still soft and mushy. The cut was made in the slotted section by fluid jet cutter without compressing the board next to the cut. The cut board was highly satisfactory. It was impossible to utilize the rotary knife cutter at this stage since the board edges would be severely damaged because of the softness of the slurry. This experiment illustrates that the jet cutter is capable of making an acceptable cut in gypsum board at or just past the initial stiffening point of the slurry.

Although other forms of calcined gypsum may be used, such as calcium sulfate anhydrite, the preferred material for use in making gypsum wallboard is calcium sulfate hemihydrate, either in the alpha or beta forms.

The common accelerators used in the aqueous gypsum slurry for forming wallboard are potassium sulfate and finely ground calcium sulfate dihydrate with or without additives such as sugar, starch or a lignosulfonate.

Various fluids such as oil or hydraulic fluid may be utilized in the high pressure jet cutter, although water either by itself or with proprietary additives is preferred.

The method of the present invention utilizing a high pressure fluid jet cutter for cutting gypsum board has a number of advantages over prior art methods utilizing rotary knives. First, the jet cutter makes a very fine cut which is smooth and does not waste much material. Second, the cut may be made at a stage in the overall set process just immediately after the initial stiffening has been reached, and while the material is still soft and not completely hard. Conventional rotary knife cutters cannot be used at this stage since they distort and destroy the gypsum board at the cut edges. By making the cut while the board is still soft, the production line can be run at an increased speed while using the same equipment. This permits a higher production for a given apparatus size. It also permits less accelerator to be used where this is desired to strengthen the ultimate gypsum board. With a conventional rotary cutter the edge is left somewhat serrated and it is subsequently necessary to use a saw to trim off the serrations. With the jet cutter, if it is properly operating, it is possible to get a smooth enough cut initially so that further trimming is not necessary.

The method of the invention can also be used to cut gypsum board past the Vicat set as well as before. When it is so carried out the cut will be smooth and will not require subsequent trimming with a saw.

The jet cutter equipment is readily available on the market and is relatively inexpensive to operate.

It is to be understood that the invention is not to be limited to the exact details of operation or structure shown and described in the specification and drawing, since obvious modifications and equivalents will be readily apparent to one skilled in the art.

Invention is claimed as follows:

1. A method for making gypsum wallboard, which comprises preparing an aqueous slurry comprising calcined gypsum, depositing said slurry on a moving conveyor to form a continuous sheet, permitting said slurry to reach at least the initial stiffening stage, cutting said sheet transversely by means of a high pressure and high velocity fluid jet into individual boards before the calcined gypsum slurry has reached the temperature rise set stage, permitting the calcined gypsum in the cut gypsum board to set completely, and drying said board.

2. A method according to claim 1, wherein said sheet is cut before the calcined gypsum slurry has reached the Vicat set stage.

3. A method according to claim 2, wherein said calcined gypsum is calcium sulfate hemihydrate.

4. A method according to claim 3, wherein said calcium sulfate hemihydrate is the alpha type.

5. A method according to claim 3, wherein said calcium sulfate hemihydrate is the beta type.

6. A method according to claim 3, wherein said calcium sulfate hemihydrate slurry is deposited between two paper cover sheets.

7. A method according to claim 3, wherein said sheet is cut immediately when the initial stiffening stage is reached.

8. A method according to claim 3, wherein said sheet is cut a short period after the initial, stiffening stage is reached.

9. A method according to claim 3, wherein said slurry comprises an accelerator.

10. A method according to claim 2, wherein said sheet is cut transversely while it is moving longitudinally on said conveyor.

11. A method according to claim 2, wherein the fluid used for cutting said gypsum sheet is water.

* * * * *